United States Patent [19]
Allen et al.

[11] Patent Number: 6,045,657
[45] Date of Patent: Apr. 4, 2000

[54] CLAY COMPOSITIONS AND THEIR USE IN PAPER MAKING

[75] Inventors: Adrian Swinburn Allen, North Yorkshire; John Oliver Stockwell, West Yorkshire; Ian James Black, Cumbria, all of United Kingdom

[73] Assignee: Ciba Specialty Chemicals Water Treatments Limited, West Yorkshire, United Kingdom

[21] Appl. No.: 09/142,216

[22] PCT Filed: Mar. 10, 1997

[86] PCT No.: PCT/GB97/00649

§ 371 Date: Oct. 6, 1998

§ 102(e) Date: Oct. 6, 1998

[87] PCT Pub. No.: WO97/33041

PCT Pub. Date: Sep. 12, 1997

[30] Foreign Application Priority Data

Mar. 8, 1996 [GB] United Kingdom .................. 9604950

[51] Int. Cl.[7] .......................... D21H 17/69; D21H 17/68; C04B 33/02; C04B 33/04
[52] U.S. Cl. ..................................... 162/181.8; 162/181.1; 162/158; 162/183; 103/486; 103/416; 103/DIG. 4; 501/147; 501/144; 501/145; 501/146
[58] Field of Search .............................. 162/158, 181.1, 162/181.7, 181.8, 183; 106/486, 416, DIG. 4, 400; 501/144, 145, 146, 147

[56] References Cited

U.S. PATENT DOCUMENTS

| | | | |
|---|---|---|---|
| 4,282,059 | 8/1981 | Davidson | 162/158 |
| 4,305,781 | 12/1981 | Langley et al. | 162/164 |
| 4,749,444 | 6/1988 | Lorz et al. | 162/168.3 |
| 4,753,710 | 6/1988 | Langley et al. | 162/164.3 |
| 4,913,775 | 4/1990 | Langley et al. | 162/164.3 |
| 4,964,954 | 10/1990 | Johansson | 162/164.6 |
| 4,969,976 | 11/1990 | Reed | 162/164.3 |
| 5,006,574 | 4/1991 | Sennett et al. | 523/351 |
| 5,223,098 | 6/1993 | Cluyse et al. | 162/181.2 |
| 5,223,463 | 6/1993 | Bilimoria et al. | 501/146 |
| 5,266,538 | 11/1993 | Knudson et al. | 501/147 |
| 5,391,228 | 2/1995 | Carroll | 106/486 |
| 5,512,135 | 4/1996 | Carré et al. | 162/175 |
| 5,537,934 | 7/1996 | Jensen et al. | 106/487 |

OTHER PUBLICATIONS

Derwent Abstr. 94-242339 for EP 608986.

Derwent Abstr. 80-77455C for EP 17353.

Derwent Abstr. 89-287039 for EP 335575.

*Primary Examiner*—Stanley S. Silverman
*Assistant Examiner*—José A. Fortuna
*Attorney, Agent, or Firm*—David R. Crichton

[57] ABSTRACT

Paper making processes, including microparticulate processes, which utilise bentonite are provided with bentonite in the form of a concentrate, or a dilute dispersion made by diluting the concentrate, wherein the concentrate is a dispersion of 15 to 40% by weight bentonite in water containing citrate and has a viscosity below 5000 cps and is a stable fluid. The concentrates are novel. They are preferably made by mixing alkaline earth bentonite with water and sodium citrate.

19 Claims, No Drawings

CLAY COMPOSITIONS AND THEIR USE IN PAPER MAKING

This invention relates primarily to paper making processes that utilise bentonite and to novel fluid bentonite concentrates suitable for use in these processes. The invention also relates to other processes in which such concentrates are useful.

There are many paper making processes which comprise providing a cellulosic suspension at a paper mill, mixing an activated bentonite dispersion into the cellulosic suspension and draining the suspension to form a wet sheet, which is then dried to provide paper (including paper board). In some instances the bentonite is added at the thick stock stage (for instance for stickies control) and the suspension is diluted to a thin stock before drainage, but in other processes the bentonite dispersion is added at the thin stock stage. It can be added before a polymeric retention aid, but there is particular interest in microparticulate processes, wherein the cellulosic suspension is subjected to shearing after adding the polymeric retention aid, and the bentonite is then added to the sheared suspension prior to drainage.

It is necessary that the bentonite should be in a highly swollen, activated, form and in practice this means that it should be in the form of a monovalent salt of bentonite such as sodium bentonite. Although there are some naturally occurring sources of sodium bentonite, most natural bentonites are alkaline earth bentonites, generally calcium or magnesium bentonites. The normal practice is to activate the alkaline earth bentonite by ion exchanging the calcium or magnesium for sodium or other alkali metal or ammonium ion. Generally this is done by exposing the bentonite to an aqueous solution of sodium carbonate, although some other activating materials are known, for instance as described in JP-A-64-45754.

Because of the high viscosifying effect of activated bentonite, it is not convenient to transport or handle a simple dispersion of activated bentonite in water which has a solids content of greater than around 5%. It is not convenient to supply such a dilute composition to the mill and so the normal way of supplying bentonite to a paper mill is in solid form. The mill mixes bentonite powder with water and optionally activating chemicals generally to form an activated dispersion having a solids content of around 3 to 5% and this is then generally diluted to around 0.05 to 1% prior to addition to the cellulosic suspension. This necessitates that the mill should be equipped with apparatus for handling and mixing the powder and the dilute dispersion.

It is known to make aqueous dispersions of bentonite having a higher solids content. The first disclosure of this in connection with the production of bentonite for paper making is in EP-A-485,124 wherein the bentonite is dispersed at high solids, for instance up to 27 to 30%, as a slurry in an aqueous solution of sodium chloride or other inorganic electrolyte. optionally some sodium polyacrylate can be used. The bentonite which is dispersed in this manner is preferably a commercial (typically calcium) bentonite containing sodium carbonate activator. Thus the activation of the bentonite is completed when the slurry is diluted with water to make a flowable dilute dispersion.

U.S. Pat. No. 5,266,538 is another disclosure of making concentrated bentonite slurries for paper making, again concentrating primarily on the use of sodium chloride or other inorganic electrolyte for depressing the viscosity of the slurry. In this publication, however, the bentonite is always introduced in sodium form. Various electrolytes are exemplified. Amongst these, there is an example of forming 25% bentonite gel with 2.5 or 5% sodium citrate in water. It is shown that these gels have viscosities respectively of 40,000 and 5,500 cps (Brookfield, 20 rpm) and that they gel on standing for 24 hours. The preferred material is said to be sodium chloride.

U.S. Pat. No. 5,391,228 repeats much of the disclosure of U.S. Pat. No. 5,266,538 but adds disclosure of a process in which calcium bentonite and sodium carbonate are slurried in aqueous sodium chloride (i.e., similar to the preferred process in EP 485,124). It also mentions the use of sodium salts such as sodium chloride or several others (including sodium citrate) in combination with a dispersant salt which is usually sodium silicate or tetra sodium pyrophosphate or sodium polyacrylate (again as suggested in EP 485,124).

There has been some commercial use of bentonite concentrates made in sodium chloride or other inorganic electrolytes but this use has demonstrated some practical difficulties. One difficulty is that it can be difficult to achieve a dispersion which is wholly stable against hard settling, i.e., there is a risk that, if any settling does occur, it may create a hard precipitate which is difficult to redisperse. However even when the concentrated slurry is formulated so as to eliminate this problem, it is found necessary to interpose an extra activation period during the dilution of the concentrate and prior to addition to the cellulosic suspension. Thus, it is necessary to dilute the concentrate with water and then allow this to mix or stand for a sufficient period to allow activity to recover, prior to addition of the diluted dispersion to the cellulosic suspension. The reason for this is that the sodium chloride or other electrolytes which have been preferred (from the point of view of convenience and efficiency of dispersion formation) all have the disadvantage that the sodium chloride or other electrolyte seems to cause salting out and double layer compression in the bentonite structure because of the high ionic strength. Thus it is necessary to give prolonged mixing with dilution water to allow the bentonite to try to recover to as highly an activated condition as is possible.

Unfortunately, however, full recovery of performance does not seem to be possible and it is a fact that the performance of dilute activated bentonite dispersions made by dilution of a concentrated slurry has proved to be inferior to the performance of a dilute activated bentonite dispersion made by direct dispersion of the corresponding bentonite powder (and activator) in water.

It would be desirable to be able to provide a bentonite concentrate which has the advantages of high solids content and fluidity and stability with the potential for giving activity in use equivalent to the optimum activity which is obtainable from the corresponding dry bentonite. In particular, it would be desirable to be able to provide paper making processes in which the mill can be supplied with a concentrate but can then easily and conveniently use that concentrate under conditions whereby performance is substantially equivalent to the performance previously obtainable using the corresponding bentonite supplied to the mill in powder form.

The normal way of providing bentonite (either for supply as powder or as a concentrate) comprises digging the bentonite out of the ground, wet mulling it with sodium carbonate or other activator, drying the mixture, grinding it, air classifying it and then supplying the resultant powder either direct to the user or to the slurrying facility where it is converted into a concentrate. It would be desirable to simplify this procedure.

In one aspect of the invention we make paper by a process comprising forming a cellulosic suspension, mixing an activated bentonite dispersion into the cellulosic suspension, draining the cellulosic suspension to form a wet sheet and drying the sheet, and in this process the activated bentonite dispersion added to the cellulosic suspension is either a stable fluid bentonite concentrate or is a dilute bentonite dispersion made by diluting the concentrate with water, and the concentrate is a dispersion of 15 to 40% by weight of bentonite in water containing citrate in a fluid stabilising and activating amount which is such that the concentrate has a viscosity (Brookfield, 20 rpm, spindle 4) of below 5,000 cps.

The invention also includes the novel concentrate which is a dispersion of 15 to 40% by weight of bentonite in water containing citrate in a fluid stabilising and activating amount which is such that the concentrate has a viscosity (Brookfield, 20 rpm, spindle 4) of below 5,000 cps.

The concentrate can be made using natural sodium bentonite or previously activated bentonite, but is particularly preferred that the concentrate should be formed from alkaline earth bentonite (in practice calcium and/or magnesium bentonite) by blending the alkaline earth bentonite with water and alkali metal or ammonium citrate (in practice sodium citrate) as activator and stabiliser. Thus by this technique it is possible simultaneously to activate the bentonite and convert it into a stable concentrate.

Accordingly, another aspect of the invention comprises blending alkaline earth bentonite with water and sodium citrate (or other alkali metal or ammonium citrate) and thereby forming a concentrate of 15 to 40% by weight activated bentonite in water containing citrate.

The paper making processes of the invention have several advantages compared to known processes of making paper using bentonite. In particular, by the invention it is now possible to obtain performance in such processes equivalent to that which is obtainable using the corresponding bentonite in powder form but without the inconvenience of having to handle powder. Thus, for the first time, we are now providing a bentonite concentrate which, when diluted into the cellulosic suspension, gives performance substantially equivalent to the corresponding powder and considerably improved compared to the corresponding concentrate made using the previously preferred activator and stabiliser, namely sodium chloride.

A further advantage is that the concentrate can be used without undergoing a prior dilution activation stage. Thus whereas the prior concentrates made using sodium chloride had to be diluted in water and then allowed to stand to activate or recover their activity, the concentrates of the invention can, without significant loss of performance, either be mixed direct into the cellulosic suspension (i.e., without any prior dilution) or can be converted to a dilute bentonite dispersion by diluting the concentrate substantially immediately before mixing the dilute bentonite dispersion with the cellulosic suspension. For instance the concentrate can be diluted in line as it is being fed towards or into the cellulosic suspension, without any significant holding stage between the dilution and the addition of the diluted dispersion to the cellulosic suspension.

Accordingly, in preferred processes the undiluted concentrate is mixed into the cellulosic suspension or the concentrate is diluted with water to form a dilute bentonite dispersion which is then mixed substantially immediately with the cellulosic suspension. If there is predilution, preferably the diluted bentonite dispersion is mixed into the cellulosic suspension in less than 5 minutes and often less than 2 minutes from the start of dilution. If there is predilution, the dilution is preferably in line and does not involve any significant holding tank or stage prior to addition to the cellulosic suspension. This is in contrast to the preferred concentrates that are described in EP 485,124 and U.S. Pat. Nos. 5,266,538 and 5,391,228 as being used in paper making, since all such concentrates would necessarily have involved a considerable holding stage in an attempt at recovering activity, and the recovered activity would still have been inferior to the activity of the corresponding powder or the activity of the bentonite in the invention.

For instance, in paper making, performance can be indicated by a simple test such as drainage time. The dry weight of bentonite required to give a particular drainage time in a particular test using the slurries of the invention is usually no more than, and often is about the same as, when the same bentonite had been activated from powder using sodium carbonate in conventional manner, whereas the dosage of bentonite required to give the same performance when the bentonite is provided as a slurry in aqueous sodium chloride is often at least 25% or 30% more, frequently at least 60% more, and often double. Thus the use of slurries in accordance with the invention can result in a saving of at least 25% and often at least 50% in the amount of bentonite that is required to give any particular performance result, compared to slurries made using sodium chloride.

Another advantage of the invention arises in paper making processes and other environments where the performance of conventional activated bentonites (eg obtained by activation from powder using sodium carbonate in conventional manner) is depressed by the pH or the osmotic pressure of hardness salts. Thus conventional bentonites tend to be less effective when the cellulosic suspension has pH below about 6.5, for instance in the range 4.2 to 5.5, than when the suspension has a higher pH, for instance 7 to 7.5. Surprisingly the activated bentonites obtained in the invention can perform very well in such suspensions without any significant loss of activity. Thus the use of the slurries in acidic suspensions can give a large improvement in the paper making process compared to the use of known bentonites.

Conventional activated bentonites also may have inferior performance when the cellulosic suspension is made using relatively hard water, for instance having a hardness above 10° dH and typically in the range 15°dH to 50°dH. Improved performance is obtained using the bentonites obtained in the invention in such hard waters. This improvement may be manifested by improved drainage rates or by reducing scale deposition or both.

A further advantage of the compositions made by activation of alkaline-earth bentonite with sodium citrate is that they can have lower pH (neutral or near neutral) than prevails when activation is by sodium carbonate.

The amounts of citrate and bentonite in the slurry will be inter-related in that greater amounts of citrate will be required with greater amounts of bentonite than with lesser amounts of bentonite. The amount must be sufficient that the concentrate is a stable fluid and, when the bentonite is being activated in the concentrate, that full activation of the bentonite by ion exchange occurs. The amount (calculated as sodium citrate) is usually in the range 1% to 100% based on the dry weight of bentonite. Often it is at least 10% and preferably at least 16%, for instance at least 20%. Often it is below 60%, and frequently not more than 40%.

When the bentonite is introduced as alkaline earth bentonite, it is preferred that sodium citrate is substantially the only activating material in the suspension. Thus if small amounts of other activators (for instance sodium carbonate) are present, preferably their effect on activation is minor relative to the effect of the sodium citrate. Preferably the sodium citrate is the only activator.

Similarly, it is generally preferred that citrate is substantially the only dispersion stabiliser in the concentrate. If other materials are present, preferably their effect is minor compared to that of the citrate. Preferably the citrate is the only dispersion stabiliser.

By saying that the citrate is substantially the only activator and/or dispersion stabiliser, we intend to allow for minor amounts of other components, for instance in a weight amount of not more than 20% and preferably not more than 10% by weight of the citrate. However larger amounts can be used provided they do not detract from the performance of the citrate.

The amount of bentonite in the concentrate should be at least 15% by weight (dry weight bentonite based on the total weight of the concentrated dispersion) since it tends to be uneconomic to provide a concentrate having lower bentonite content. It is not usually more than about 35%, and often not more than 30%, since it becomes more difficult to provide a concentrate of good quality bentonite wherein the concentrate has good fluid stability when the amount of bentonite is very high. However when the bentonite is of rather poor quality, i.e., having rather low swelling potential, then amounts of bentonite above 35%, and in some instances even up to 50%, may be appropriate.

In practice the amount of bentonite is usually at least 20% and often up to 28, 30 or 35% by weight.

The bentonite can be introduced in sodium form, as a result of being a naturally occurring sodium bentonite, or it can be introduced as activated bentonite formed by previously activating alkaline earth metal bentonite with sodium carbonate or other activator, in which event some residual sodium carbonate may be carried into the concentrate. When the bentonite is introduced in sodium form, the citrate can be added in any convenient form, for instance as citric acid or as alkali metal or ammonium citrate, for instance potassium, sodium or ammonium citrate. Generally it is preferred to use sodium citrate or, in some instances, citric acid together with sufficient sodium hydroxide to form sodium citrate. When the bentonite is introduced as alkaline earth metal bentonite, then it is preferred for the citrate to be introduced as sodium citrate.

The amount of citrate which is required to form a stable suspension will depend upon the nature of the bentonite and the nature of its ionic form. There is some evidence indicating that if the bentonite is introduced in sodium form then larger amounts of citrate may be required than when the bentonite is introduced in calcium or magnesium form (i.e., larger amounts may be required to give equivalent fluidity). Also, the amount which is required will vary according to the grade of bentonite and so it is necessary to conduct tests to determine the optimum for any particular grade and chemical type of bentonite. The nature of the water may also influence the amount of citrate.

If the amount of citrate is inadequate then the concentrated dispersion will have too high a viscosity when initially manufactured and/or will not be a stable fluid and/or will be unacceptably thixotropic and/or will form an unacceptable gel on standing. If the amount is too high then the dispersion may become thinner than is desirable and may even become an unstable thin dispersion.

By routine experimentation it is possible to select an amount of citrate, for any particular bentonite and water quality, that is necessary to give a fluid stable dispersion having the desired viscosity. By saying that the dispersion is a fluid stable dispersion we mean that it does not settle to give a hard, unredispersible, precipitate and does not gel to give an unacceptable gel, and preferably remains as a fluid which is homogeneous or which can easily be made homogeneous by simple stirring. In practice, the compositions of the invention can easily be formulated such that a small amount of supernatent may accumulate on storage but the composition otherwise appears homogeneous. The quoted viscosity is preferably maintained throughout storage and, in any event the suspension should have the quoted viscosity 48 hours after initial manufacture.

Generally the viscosity is below 4000 cps and it can be below 2000 cps. It is usually undesirable for the voiscosity to be too low and so should be above 100 cps and generally it is above 500 cps, often above 1000 cps. All viscosity values are measured at room temperature. The suspension can be thixotropic provided it is easily possible to cause it to flow when required. The suspension must be easily miscible with water, by simple stirring.

The amount of citrate, measured as sodium citrate, is usually at least 3% and most usually at least 5% by weight (based on the total weight of the dispersion). When the bentonite is introduced as an alkaline earth bentonite, amounts of 3% or 4% can be adequate, but at least 5% or 6% is usually preferred. When the bentonite is introduced as sodium bentonite, amounts of at least 6% are generally preferred. Irrespective of whether the bentonite is sodium, calcium or magnesium, the amount can be as much as 20% but usually is less than 15% by weight, with preferably not more than 12%. Amounts of 6 to 10% are often suitable.

It will be appreciated that slurries which have been made by activating alkaline earth metal bentonite with sodium citrate can be identified by virtue of the fact that the aqueous medium will contain calcium or magnesium citrate, deriving from the ion exchange of the sodium of the sodium citrate with the calcium or magnesium of the alkaline earth bentonite.

The bentonite can be any of the anionic swelling clays that are conventionally referred to as bentonites. These are usually smectites or montmorillonites, the latter being preferred. Suitable smectite or montmorillonite clays include Wyoming bentonite and Fullers Earth and various clays including those known by the chemical terms hectorite or bentonite.

The stability of the concentrates of the invention should be such that they maintain fluidity (often thixotropic fluidity) for at least a week and preferably several weeks or months, and in particular such that they do not provide a hard sediment (which is difficult to redisperse) during normal storage or transport.

The concentrate can be used in any paper making process where an activated bentonite dispersion is added to the cellulosic stock. For instance it can be used in processes where the bentonite dispersion is added as a pitch dispersant, generally at the thick stock stage (e.g., when the cellulosic suspension contains more than 2% cellulose).

The invention is preferably applied to processes in which the bentonite is incorporated as part of the retention system, either to prepare the cellulosic fibres for retention by a polymer or as part of a microparticulate retention system.

One paper-making process to which the invention can be applied is a process in which bentonite is added to a cellulosic suspension, typically in an amount of 0.02 to 2% dry weight, and a polymeric retention aid is added subsequently, generally after the last point of high shear (for instance in the head box immediately prior to drainage). The polymer can be non-ionic, anionic or cationic. The cellulosic suspension can be made from relatively pure pulp or from pulp having a relatively high cationic demand.

Processes of this type that are of particular value are those in which the pulp has a relatively high cationic demand and the polymer is substantially non-ionic or anionic and the paper product is preferably newsprint or fluting medium. Processes of this type in which the total filler content is relatively low are described in U.S. Pat. No. 4,305,781 and EP-A-17353 to which reference should be made for further details of suitable non-ionic or low ionic polymers and suitable cellulosic suspensions and which is hereby incorporated by reference. More highly ionic or cationic polymers can also be used. These processes are of particular value when the cellulosic suspension contains de-inked waste. Suitable polymers and fillers (when the pulp is filled) are also described in EP-A-608986 and AU-A-63977/86.

It is particularly preferred to apply the invention to microparticulate paper making processes, namely processes in which polymeric retention aid is added to the cellulosic suspension, the suspension is subjected to shearing, and the bentonite is then added after the shearing, and often after the last point of high shear for instance at the headbox, prior to drainage. The polymer can be anionic or non-ionic but is often cationic. It can be a natural material such as cationic starch but is preferably a synthetic polymer.

The shearing can be due merely to turbulence along a duct but preferably it is caused by passage through a centriscreen or other cleaning device or a fan pump or a mixing pump or other device for deliberately applying shear. Preferred processes include those commercialised by the applicants under the trade mark Hydrocol and are described in, for instance, EP-B-235,893 and U.S. Pat. Nos. 4,753,710, 4,913,775 and 4,969,976 and EP-B-335,575, all of which are hereby incorporated by reference. The optimum amount of polymeric retentin aid can be determined by routine experimentation and will depend upon the nature of the cellulosic suspension and, inter alia, on whether or not low molecular weight high charge density cationic polymer and/or cationic starch and/or other dry strength resin has been incorporated in the suspension, all as described inthe aforementioned patents.

The polymeric retention aids which are used are usually water soluble, or substantially water soluble polymers of ethylenically unsaturated monomers and usually have molecular weight above 500,000 (measured by gel permeation chromatography) or usually intrinsic viscosity (measured by suspended level viscometer in 1N sodium chloride buffered to pH 7 at 25° C.) of at least 4 dl/g.

Suitable polymers are described in the aforementioned patents.

The amount of the bentonite which is used in all these processes can be within the conventional ranges which are described in the aforementioned patents. As mentioned above, the bentonite can be added into the cellulosic suspension either while it is still in the form of the concentrate or simultaneously with or soon after dilution with water. This dilution can be to, for instance, a solids content in the range 3 to 8% or it can be dilution to a solids content of below 3%, for instance down to 0.1% or even less in some instances.

The invention also includes processes in which the novel concentrate is used for other purposes. For instance it can be used in pulp dewatering, paper sludge dewatering, liquid solid separation processes, effluent clarification, inky waste water clarification all in paper-related industries, and it can be used in other industries. For instance it can be a convenient way of formulating a bentonite slurry which is to be pumped for eventual use in any of the known ways of using bentonite in other industries. It can be used as a convenient way of introducing bentonite into iron ore pelletisation processes where the bentonite is being used in conventional manner as a binder.

The invention also includes a process of making an activated bentonite slurry comprising quarrying raw alkaline earth bentonite and mixing the quarried material with water and sodium citrate and thereby forming a coarse slurry containing at least 10% bentonite and filtering, classifying or cleaning the slurry. The filtering can be any process designed to remove physically large or dense material not suitable for the final process. The size of the filter classification will be selected so that the resultant bentonite particles that are preferably within the size range which is conventional for activating bentonite for the ultimate intended use. The filter may be, for instance, a cyclonic cleaning device or other classifying device or cleaning device.

Having removed the waste material by filtration, the resultant slurry can then be dried in conventional manner to make powdered activated bentonite or it can be supplied to a user as a concentrated dispersion in accordance with the invention. If this is required, then naturally the amount of bentonite which is slurried into the water and sodium citrate should be sufficient to give a concentrated dispersion in accordance with the invention. Thus generally the amount of bentonite which is slurried into the water and sodium citrate is in the range 15 to 40%. The amount of sodium citrate which is required for this process must be sufficient to provide for activation of the alkaline earth bentonite. If it is not necessary for the slurry to be stable then it can be less than the amount which is required to give fluid stability to the slurry.

This process of making activated bentonite eliminates many of the stages associated with conventional production of activated bentonite. Thus it is now possible to eliminate the conventional stages of wet mulling, drying and grinding and air classifying and, instead, they can be replaced by the simple on-line or batch process of slurrying the bentonite into aqueous sodium citrate and filtering (including classifying and cleaning).

Similarly, other concentrates, such as concentrates made using any of fluid stabilisers mentioned in EP 485,124, can be made by the same general technique modified by the use of the stabilisers of EP 485,124 in place of the sodium citrate. Similarly, other materials mentioned in U.S. Pat. Nos. 5,266,538 or 5,391,228 can be used in place of the sodium citrate. However all these modified processes would have the disadvantage that the final product does not have the advantages which are described above in connection with the products made using citrate.

The following are examples.

Example 1 (Comparative)

Dispersion A is made by slurrying 5 parts calcium bentonite in 95 parts water.

Dispersion B is made by the conventional activating procedure of slurrying a mixture of 4.7 parts calcium bentonite, 0.3 parts sodium carbonate and 95 parts water to give a 5% composition of sodium bentonite, which is then usually further diluted with water prior to use.

Dispersion C is made by slurrying 23.5 g calcium bentonite and 1.5 g sodium carbonate (thus providing 25 g sodium bentonite) with 3 g sodium chloride and 72 g water. This 25% slurry then has to be activated in water, typically after dilution to about 5%, prior to use.

Accordingly, the processes using dispersion B are typical of those conducted using conventional powdered bentonite which has to be activated before use, and processes using dispersion C are typical of those using sodium chloride slurries as in the prior art discussed above.

Example 2

25 parts by weight calcium bentonite, 6 parts by weight sodium citrate and 69 parts by weight water are thoroughly mixed together to form a fluid suspension. This is labelled dispersion D. After standing for 48 hours, it had a Brookfield viscosity, measured at 20 rpm of 575 cP.

When the process was repeated using 10 parts sodium citrate and 65 parts water, to make dispersion E, the viscosity after 48 hours was 737 cP.

Dispersion F was formed in similar manner using 9 parts sodium citrate, 66 parts water and 25 parts of a sodium bentonite made by premixing 23.5 parts calcium bentonite and 1.5 parts sodium carbonate.

Dispersion G was made using 25 parts calcium bentonite, 9 parts sodium citrate and 66 parts water.

Example 3

In this example various of the dispersions given above are utilised in a laboratory simulation of processes such as those described in U.S. Pat. No. 4,753,710. A suitable thinstock (usually 0.5% bleached Kraft Furnish) is provided, an appropriate dosage (usually 500 g per ton) of a high molecular weight (typically intrinsic viscosity 6 dl/g) cationic polyacrylamide (usually 40% by weight dimethylaminomethyl acrylate quaternised with methyl chloride and 60% by weight acrylamide) is added, the suspension is sheared for 60 seconds at 1,500 rpm, the required dosage of bentonite dispersion is added, the mixture is subjected to gentle mixing and the Schopper Riegler drainage time is recorded for 700 ml to drain from 1,000 ml of the treated suspension, using a baffled Britt jar.

Each of the following tables represents a different set of experiments. In each set of experiments, the amounts in the column headed "Bentonite" always indicate the dosage of bentonite expressed in dry weight grams per ton paper and the figures in the columns headed by letters B to G show the drainage time using the shown amount of bentonite introduced, respectively, as dispersions B to G. In each instance, for the purposes of this test, the best results are obtained with the lowest drainage time, especially when this is obtained at a low dose of bentonite.

TABLE 1

| Bentonite | B | C | F |
|---|---|---|---|
| 0 | 84 | 84 | 84 |
| 250 | 50 | 77 | 46 |
| 500 | 36 | 78 | 31 |
| 1000 | 22 | 64 | 20 |
| 2000 | 14 | 50 | 14 |
| 4000 | 11 | 35 | 12 |

This demonstrates that the prior art slurries formed in sodium chloride (dispersion C) tend to give poor results compared to conventionally activated powdered bentonite (dispersion B) but the dispersion F of the invention again gives results as good as or a little better than the conventional product B and much better than the prior art concentrate C. Additionally, it has the advantages of ease of manufacture and ease of supply and use compared to processes using dry products (dispersion B).

TABLE 2

| Bentonite | G | C |
|---|---|---|
| 0 | 52 | 52 |
| 250 | 32 | 48 |
| 500 | 24 | 44 |
| 1000 | 16 | 40 |
| 2000 | 11 | 30 |
| 4000 | 9 | 21 |

This clearly demonstrates the fact that the sodium citrate slurry concentrate of the inventive gives, at all dosages, a performance which is dramatically better than the performance attainable with the sodium chloride slurry of the prior art.

Example 4

This example demonstrates that it is unimportant in the invention whether or not the bentonite concentrate is diluted before addition to the cellulosic suspension, whereas this makes a critical difference with the prior art concentrates.

Thus, when a 25% slurry in aqueous sodium chloride is diluted first to 5% and then to 0.25%, the drainage time in a test using 2000 g/t bentonite is about 75 seconds compared to 30 seconds for the corresponding bentonite powder. When the dilution is direct from 25% to 0.25%, the drainage time is even worse.

When a 25% slurry in sodium citrate is used, the drainage time at 2000 g/t is about 30, irrespective of the system of dilution.

We claim:

1. A process of making paper comprising forming a cellulosic suspension, mixing an activated bentonite dispersion into the cellulosic suspension, draining and cellulosic suspension to form a wet sheet and drying the sheet, wherein the activated bentonite dispersion which is added to the cellulosic suspension is a stable, fluid, bentonite concentrate or a dilute bentonite dispersion made by diluting the concentrate with water, and the concentrate is a dispersion of 15 to 40% by weight of bentonite in water containing citrate in a fluid stabilising and activating amount which is such that the concentrate has a viscosity (Brookfield, 20 rpm, spindle 4) of below 2000 cps.

2. A process according to claim 1 in which the activated bentonite dispersion which is added to the cellulosic suspension is the concentrate or is a diluted bentonite dispersion made by diluting the concentrate substantially immediately before mixing the diluted bentonite dispersion with the cellulosic suspension.

3. A process according to claim 1 or claim 2 and which is a microparticulate retention process comprising mixing a polymeric retention aid into the cellulosic suspension, shearing the suspension, mixing the activated bentonite dispersion into the sheared suspension and draining the resultant cellulosic suspension and drying the resultant wet sheet.

4. A process according to claim 3 in which the polymeric retention aid is cationic starch or a synthetic cationic polymer having molecular weight above 500,000.

5. A process according to claim 1 wherein the fluid bentonite concentrate has been made by blending alkaline earth bentonite with water and alkali metal or ammonium citrate as activator and stabilizer.

6. A process according to claim 5 in which sodium citrate is the only activator in the concentrate.

7. A process according to claim 1 in which citrate is the only dispersion stabiliser in the concentrate.

8. A process according to claim 1 in which the amount of bentonite is 20 to 35% by weight of the concentrate.

9. A process according to claim 1 in which the amount of citrate, measured as sodium citrate, is 3 to 20% by weight of the concentrate.

10. A process according to claim in which the amount of citrate, measured as sodium citrate, is at least 6% by weight based on the weight of the concentrate.

11. A concentrate which is a stable, fluid, bentonite dispersion of 15 to 40% by weight bentonite in water containing citrate in a fluid stabilising and activating amount which is such that the concentrate has a viscosity (Brookfield, 20 rpm, spindle 4) of below 2000 cps.

12. A concentrate according to claim 11 which has been made by blending alkaline earth bentonite with water and sodium citrate as activator and stabiliser.

13. A concentrate according to claim 12 in which sodium citrate is the only activator in the concentrate.

14. A concentrate according to claim 11 in which citrate is the only dispersion stabiliser in the concentrate.

15. A concentrate according to claim 11 in which the amount of bentonite is 20 to 35% by weight of the concentrate.

16. A concentrate according to claim 11 in which the amount of citrate, measured as sodium citrate, is 5 to 20% based on the weight of the concentrate.

17. A concentrate according to claim 11 in which the amount of citrate, measured as sodium citrate, is at least 6% based on the weight of the concentrate.

18. A method of making concentrate according to claim 11 comprising blending alkaline earth bentonite with water and sodium citrate.

19. A method of making a concentrate that is a stable, fluid, bentonite dispersion of 15 to 40% by weight bentonite in water containing citrate in a fluid stabilizing and activating amount which is such that the concentrate has a viscosity (Brookfield, 20 rpm, spindle 4) of below 2000 cps comprising mixing more than 15% by weight raw quarried alkaline earth bentonite with water and alkali metal or ammonium citrate, filtering the slurry and thereby providing the concentrate.

* * * * *